(12) United States Patent
Chaudhari et al.

(10) Patent No.: US 12,244,244 B2
(45) Date of Patent: Mar. 4, 2025

(54) FAULT TOLERANT SYSTEM AND METHOD FOR CONTINUOUS SKIP-FIRE PULSE WIDTH MODULATION FOR AN ACTIVE NEUTRAL POINT CLAMPED CONVERTER

(71) Applicant: General Electric Renovables Espana, S.L., Barcelona (ES)

(72) Inventors: Pushkar Chandrakant Chaudhari, Bengaluru (IN); Kapil Jha, Bengaluru (IN); Fernando Arturo Ramirez Sanchez, Salem, VA (US); Nathaniel Robert Michener, Roanoke, VA (US)

(73) Assignee: General Electric Renovables Espana, S.L., Barcelona (ES)

( * ) Notice: Subject to any disclaimer, the term of this patent is extended or adjusted under 35 U.S.C. 154(b) by 499 days.

(21) Appl. No.: 17/731,780

(22) Filed: Apr. 28, 2022

(65) Prior Publication Data
US 2023/0353039 A1    Nov. 2, 2023

(51) Int. Cl.
*H02M 7/487* (2007.01)
*H02M 1/14* (2006.01)
*H02M 1/32* (2007.01)
*H02M 5/458* (2006.01)

(52) U.S. Cl.
CPC ............ *H02M 7/487* (2013.01); *H02M 1/14* (2013.01); *H02M 1/32* (2013.01); *H02M 1/325* (2021.05); *H02M 5/4585* (2013.01)

(58) Field of Classification Search
CPC ...... H02M 1/32; H02M 5/4585; H02M 1/325; H02M 7/487; H02M 1/14
See application file for complete search history.

(56) References Cited

U.S. PATENT DOCUMENTS

| | | | |
|---|---|---|---|
| 8,207,736 B2 | 6/2012 | Chu et al. | |
| 8,471,584 B2 | 6/2013 | Soldi et al. | |
| 8,472,153 B1 * | 6/2013 | Grbovic | H02H 7/1216 361/101 |

(Continued)

FOREIGN PATENT DOCUMENTS

CN    103378759 B    4/2017

OTHER PUBLICATIONS

European Search Report Corresponding to EP23170754 on Sep. 25, 2023.

(Continued)

*Primary Examiner* — Yusef A Ahmed
(74) *Attorney, Agent, or Firm* — Dority & Manning, P.A.

(57) ABSTRACT

A controller-implemented method and system for operating a multi-level bridge power converter connected to a power grid in a fault-tolerant operational mode, the power converter including a first converter coupled to a DC link, the first converter including a plurality of switching devices. The method and system determine an on/off scheme for the switching devices in the first converter when one or more of the switching devices has failed in a shorted state, wherein the on/off scheme is dependent upon phase current direction through the first converter. The phase current direction is indirectly determined by sensing a pole voltage of the first converter and implementing the on/off scheme in the fault-tolerant mode when the pole voltage changes from zero to a +/−value indicating that the phase current through the first converter has switched direction.

9 Claims, 6 Drawing Sheets

(56) References Cited

U.S. PATENT DOCUMENTS

| | | | |
|---|---|---|---|
| 10,063,161 B2 | 8/2018 | Li et al. | |
| 10,224,830 B2* | 3/2019 | Basic | H02M 1/143 |
| 10,355,618 B2 | 7/2019 | Zhuang et al. | |
| 10,547,251 B1* | 1/2020 | Pan | H02M 1/36 |
| 10,581,342 B2* | 3/2020 | Zhang | H02M 7/5395 |
| 10,742,149 B1* | 8/2020 | Gadiraju | H02J 3/381 |
| 10,855,079 B1* | 12/2020 | Holliday, III | H02J 3/16 |
| 11,552,575 B1* | 1/2023 | Michener | H02M 7/487 |
| 11,594,953 B1* | 2/2023 | Ramirez Sanchez | H02J 3/32 |
| 2012/0300510 A1* | 11/2012 | Jensen | H02J 3/36 363/35 |
| 2013/0155729 A1* | 6/2013 | Lee | G01R 31/42 363/37 |
| 2013/0181532 A1* | 7/2013 | Kjær | H02M 7/5387 307/82 |
| 2013/0293988 A1* | 11/2013 | Li | H02P 29/027 361/30 |
| 2014/0198548 A1* | 7/2014 | Zhang | H02M 7/4837 363/131 |
| 2014/0307497 A1* | 10/2014 | Yoo | H02M 7/483 363/131 |
| 2015/0002106 A1* | 1/2015 | Inagaki | H02M 7/493 322/79 |
| 2015/0180273 A1* | 6/2015 | Wagoner | H02J 3/28 307/31 |
| 2015/0249412 A1* | 9/2015 | Larsen | H02P 23/26 290/44 |
| 2015/0309123 A1* | 10/2015 | Berroteran Gil | G01R 31/40 324/764.01 |
| 2016/0087558 A1* | 3/2016 | Yamamoto | H02P 29/025 318/563 |
| 2016/0352251 A1 | 12/2016 | Li et al. | |
| 2017/0250644 A1* | 8/2017 | Ikai | H02P 3/22 |
| 2018/0109201 A1* | 4/2018 | Li | F03D 17/00 |
| 2018/0198392 A1* | 7/2018 | Wagoner | H02K 7/1838 |
| 2019/0067932 A1* | 2/2019 | Li | H02M 7/2173 |
| 2019/0312502 A1* | 10/2019 | Ganireddy | H02M 7/23 |
| 2020/0099312 A1* | 3/2020 | Trainer | H02M 7/2173 |
| 2020/0295595 A1* | 9/2020 | Shigeta | H02J 9/062 |
| 2020/0358289 A1* | 11/2020 | Kolhatkar | F03D 80/60 |
| 2021/0167715 A1* | 6/2021 | Tagawa | H02P 29/026 |
| 2021/0184608 A1* | 6/2021 | Shaqqo | H02J 3/381 |
| 2021/0203242 A1* | 7/2021 | Banda | H02M 7/487 |
| 2021/0320601 A1* | 10/2021 | Wagoner | F03D 9/255 |
| 2022/0060123 A1* | 2/2022 | Shaqqo | H02M 7/487 |
| 2022/0154691 A1* | 5/2022 | Wessels | F03D 15/00 |
| 2022/0294333 A1* | 9/2022 | Ramirez Sanchez | H02M 7/487 |
| 2022/0321039 A1* | 10/2022 | Mukherjee | F03D 17/00 |
| 2023/0058067 A1* | 2/2023 | Pan | H02M 7/487 |
| 2023/0163695 A1* | 5/2023 | Jha | H02M 1/32 363/132 |
| 2023/0344332 A1* | 10/2023 | Michener | H02M 1/32 |
| 2024/0248128 A1* | 7/2024 | Jha | F03D 17/021 |

OTHER PUBLICATIONS

Li et al., Design, Control and Characteristics of Multilevel Active NPC Converters for High Power Applications, Chapters 1 and 3, Jan. 1, 2010, 233 Pages.

Li et al., Three-Level Active Neutral-Point Clamped (ANPC) Converter with Fault Tolerant Ability, XP031442780, IEEE Applied Power Electronics Conference and Exposition 2009, Chapters 1, 3 and Tables III, IV, Feb. 15, 2009, 840-845.

Xu et al., An Improved Fault-Tolerant Control Strategy for High-Power ANPC Three-Level Inverter Under Short-Circuit Fault of Power Devices, XP011723450, IEEE, vol. 7, Apr. 29, 2019, 55443-55457.

Li et al., Analysis and Design of Active NPC (ANPC) Inverters for Fault-Tolerant Operation of High-Power Electrical Drives, XP011391770, IEEE Transactions on Power Electronics, Institute of Electrical and Electronics Engineers, vol. 27, No. 2, Feb. 1, 2012, 519-533.

Zhang et al., A Megawatt-Scale Medium-Voltage High-Efficiency High Power Density "SiC+Si" Hybrid Three-Level ANPC Inverter for Aircraft Hybrid-Electric Propulsion Systems, XP011755132, IEEE Transactions on Industry Applications, vol. 55, No. 6, Nov. 1, 2019, 5971-5980.

U.S. Appl. No. 17/534,507, filed Nov. 24, 2021.

Fazio et al., Fault Detection and Reconfiguration Strategy for ANPC Converters, 2012 15th International Power Electronics and Motion Control Conference (EPE/PEMC) Sep. 4-6, 2012, IEEE, Novi Sad, Serbia. Abstract Only.

* cited by examiner

FAULT TOLERANT SYSTEM AND METHOD FOR CONTINUOUS SKIP-FIRE PULSE WIDTH MODULATION FOR AN ACTIVE NEUTRAL POINT CLAMPED CONVERTER

FIELD

The present disclosure relates generally to electrical power systems, and more particularly to a system and method for control of a multi-level power converter in an electrical power system.

BACKGROUND

Wind turbines have received increased attention as a renewable energy source. Wind turbines use the wind to generate electricity. The wind turns multiple blades connected to a rotor that is coupled to a generator for generation of electricity. Certain wind turbines include a doubly-fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Multi-level converters (such as neutral point clamped converters) are generally used in high power industrial applications such as variable speed drive (VSD) systems or in energy conversion applications such as a solar (or photovoltaic) power generation systems, wind turbine generators or marine and hydrokinetic power generation systems. The general function of the multi-level converter is to synthesize a sinusoidal voltage by several levels of voltages, typically obtained from capacitor voltage sources. A three-level converter includes two capacitor voltages in series with the center tap as the neutral. Each phase leg of the three-level converter has two pairs of switching devices in series. The switching device is bidirectional in current, often realized as anti-parallel connection of a unidirectional electronic switching device (e.g., IGBT, IGCT) and a diode (freewheeling diode).

Occasionally (and for various reasons), the switching devices in a multi-level converter fail in a short-circuit condition. For example, if there is large power loss within the switching device due to electrical stress or overcurrent, the switching device overheats, which may lead to thermal breakdown of the switching device. Similarly, when an inductive load or inductive current is switched off, the switching device may experience an overvoltage that results in voltage breakdown of the switching device. Once a switching device is broken down or destroyed due to overheating or overvoltage, protective measures are taken to prevent a chain reaction that could result in destruction of the entire multi-level converter bridge.

It is desirable that the protective measures not only prevent further (and potentially catastrophic) damage to the power converter, but also allow for continued "fault tolerant" operation of the converter.

Accordingly, it is important to provide protection against a catastrophic failure of a multi-level converter due to failure of one of the switching devices (such as an IGBT failure in a multi-leg neutral point clamped (NPC) converter or multi-leg active neutral point (ANPC) converter) while also enabling continued operation of the converter in a fault-tolerant mode.

BRIEF DESCRIPTION

Aspects and advantages of the disclosure will be set forth in part in the following description, or may be obvious from the description, or may be learned through practice of the disclosure.

In one aspect, the present disclosure is directed to a computer-implemented method for operating a multi-level bridge power converter of an electrical power system in a fault-tolerant mode, wherein the electrical power system is connected to a power grid and the multi-level power converter includes a first converter coupled to a DC link, the first converter having a plurality of switching devices. An embodiment of the method includes determining an on/off scheme for the switching devices in the first converter that provides for continuous fault-tolerant operational mode of the first converter when one or more of the switching devices in the converter has failed. The on/off scheme is dependent upon phase current direction through the first converter. In other words, the scheme is implemented (via appropriate gate drive signals) upon a change in the phase current direction. This embodiment of the method includes indirectly determining the phase current direction by sensing a pole voltage of the first converter and implementing the on/off scheme in the fault-tolerant operational mode when the pole voltage changes from zero to a +/−value indicating that the phase current through the first converter has switched direction.

In a particular embodiment, the plurality of switching devices in the first converter includes at least four inner switching devices and at least two outer switching devices in an active neutral point clamped topology, wherein the first converter connects to the DC-link by turning on the inner switching devices. In the fault-tolerant mode of operation, one of the outer switching devices is failed in the shorted state and the on/off scheme prevents a current shoot-through across the DC-link when connecting the first converter to the DC-link.

In this particular embodiment, the switching devices may be insulated gate bipolar transistors (IGBTs) and designated as a first IGBT through a sixth IGBT, wherein the second IGBT, the third IGBT, the fifth IGBT, and the sixth IGBT are the inner switching devices, and the first IGBT and the fourth IGBT are the two outer switching devices. A configuration of the switching devices in the on/off scheme for the continued fault-tolerant mode of operation may be one of: the first IGBT is failed in the shorted state, the second IGBT and the sixth IGBT are on; and the fifth IGBT and the third IGBT are off; or the fourth IGBT is failed in the shorted state, the third IGBT and the fifth IGBT are on; and the second and the sixth IGBT are off.

The pole voltage across the first converter is an essentially immediate indication of the change of phase current, and the magnitude of the voltage change is readily detectable. For this reason, the pole voltage may be directly sensed by a voltage sensor configured for direct detection of the pole voltage, the voltage sensor being in communication with the controller.

In a certain embodiment of the power converter, the first converter is coupled to a second converter via the DC-link, the second converter also including a plurality of the switching devices, wherein the method functions to also provide a fault-tolerant mode for the second converter when one of the switching devices in the second converter has failed in a shorted state.

The electrical power system may be a wind turbine power system that includes a generator connected to the power grid, wherein the power converter is operationally configured with the generator.

In another embodiment, a controller-implemented method is provided for operating a multi-level bridge power converter of an electrical power system in a fault-tolerant operational mode, wherein the electrical power system is connected to a power grid and the multi-level power converter includes a first converter and a second converter coupled together via a DC link, each of the first and second converters including a plurality of switching devices, wherein one of the switching devices in the first or second converter is failed in a shorted state. This method embodiment includes determining an on/off scheme for the switching devices in the first and second converter that provides for continuous fault-tolerant operation of the respective converter when one or more of the switching devices in the respective converter has failed in a shorted state, wherein the on/off scheme is dependent (implemented) upon a change in phase current direction through the respective converter. The method includes indirectly determining the phase current direction through the respective converter by sensing a pole voltage of the respective converter and implementing the on/off scheme when the pole voltage changes from zero to a +/−value indicating that the phase current through the respective converter has switched direction.

The invention also encompasses a multi-level bridge power converter with a plurality of phase legs, the power converter including a first converter and a second converter coupled together via a DC link, each of the first and second converters including a plurality of switching devices. A controller is configured to operate the first and second converters in a fault-tolerant operational mode when one of the switching devices in the first or second converter is failed in a shorted state. For this purpose, the controller is configured to: implement (via appropriate gate drive signals) an on/off scheme for the switching devices in the respective first and second converters that provides for continuous fault-tolerant operation of the respective converter when one or more of the switching devices in the respective converter has failed in a shorted state, wherein the on/off scheme is dependent (implemented) upon a change in phase current direction through the respective converter; indirectly determine the phase current direction through the respective converter by sensing a pole voltage of the respective converter; and implement the on/off scheme when the pole voltage changes from zero to a +/−value indicating that the phase current through the respective converter has switched direction.

In a particular embodiment of the multi-level bridge power converter, the plurality of switching devices in each of the first and second converters includes at least four inner switching devices and at least two outer switching devices in an active neutral point clamped topology, wherein the first and second converters connect to the DC-link by the controller turning on the inner switching devices, and wherein in the fault-tolerant operational mode one of the outer switching devices is failed in the shorted state and the on/off scheme implemented by the controller prevents a current shoot-through across the DC-link when connecting the first or second converter to the DC-link.

In this particular embodiment of the multi-level bridge power converter, the switching devices are insulated gate bipolar transistors (IGBTs) and designated as a first IGBT through a sixth IGBT, wherein the second IGBT, the third IGBT, the fifth IGBT, and the sixth IGBT are the inner switching devices, and the first IGBT and the fourth IGBT are the two outer switching devices, wherein the on/off scheme of the fault-tolerate operational mode includes one of: the first IGBT is failed in the shorted state, the second IGBT is on, and the fifth IGBT is off; or the fourth IGBT is failed in the shorted state, the third IGBT is on, and the sixth IGBT is off.

The multi-level bridge power converter may include a voltage sensor configured to directly or indirectly detect the pole voltage of the respective converter, the voltage sensor in communication with the controller.

The present invention also encompasses an electrical power system configured to supply electrical power to a power grid, wherein the electrical power system includes the multi-level power converter discussed above.

The electrical power system may include a wind turbine generator configured with the multi-level power converter.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Aspects of the present invention are particularly useful for pulse width modulation (PWM) of ANCP power converter of a wind turbine DFIG in fault mode. Accordingly, general concepts and operation of a wind turbine power system are described herein for an appreciation of this particular working embodiment of the invention. It should be understood, however, that the present disclosure is not limited to implementation with a power converter in a DFIG (or in a wind turbine power system in general).

Figure 1:
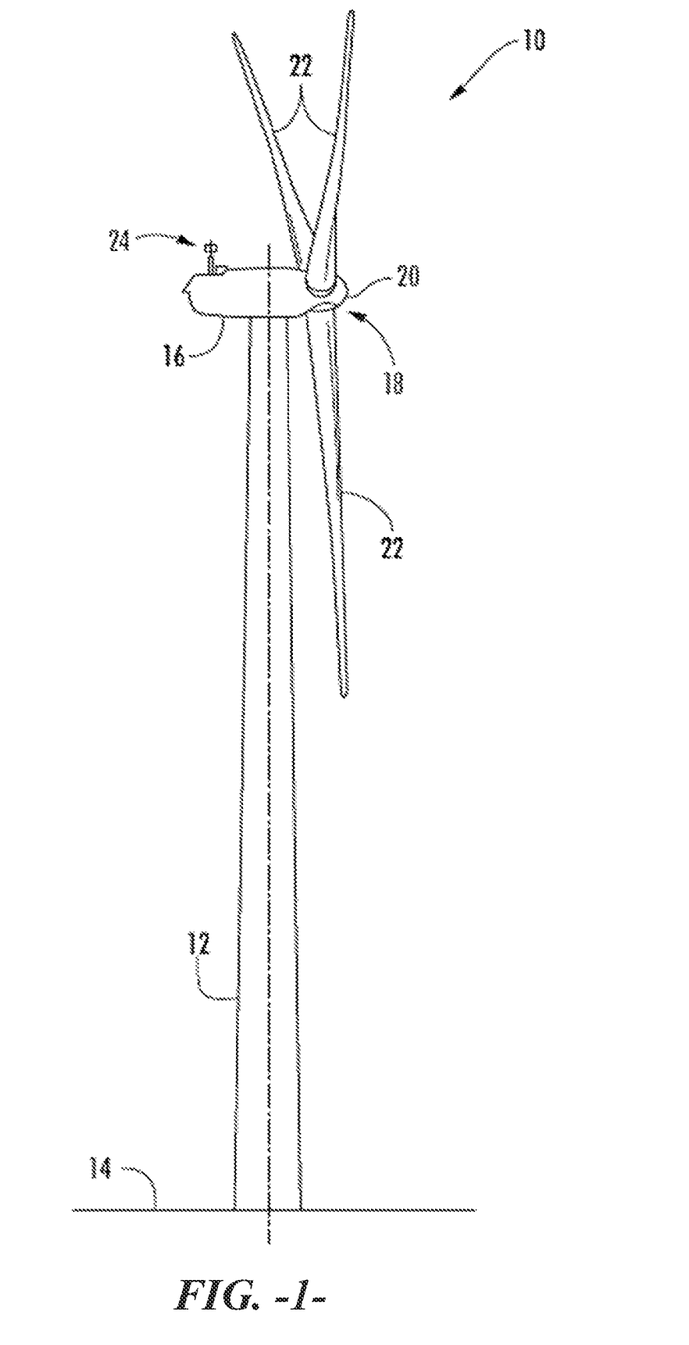
FIG. 1 illustrates a perspective view of one embodiment of a conventional wind turbine according to the present disclosure.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) for production of electrical energy. One or more wind conditions, such as wind speed and/or wind direction may also be monitored via a wind sensor 24, such as an anemometer, located on the nacelle 16 or any other suitable location near the wind turbine 10.

Figure 2:
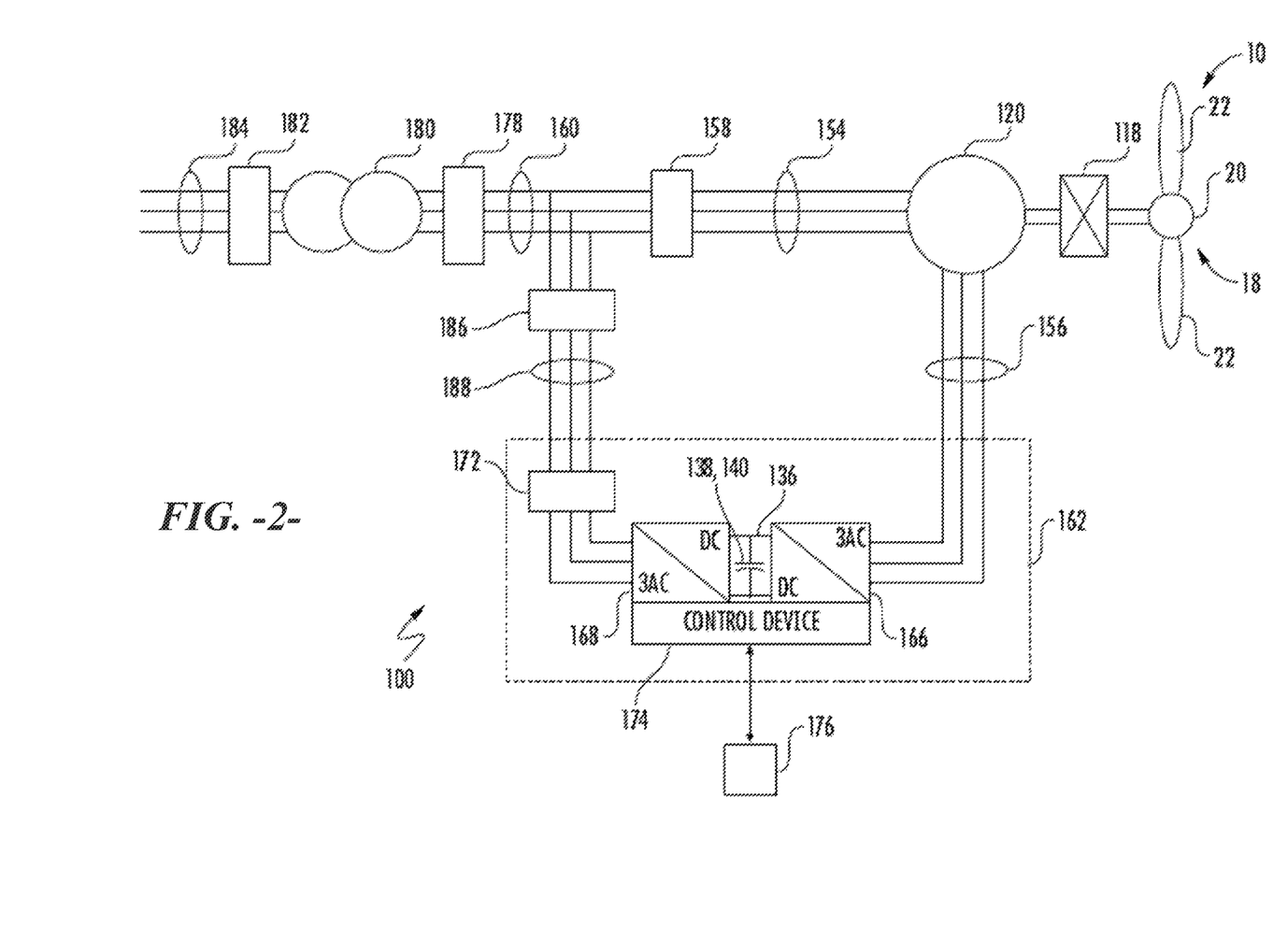
FIG. 2 illustrates a schematic diagram of one embodiment of a conventional DFIG wind turbine system according to the present disclosure.

Referring now to FIG. 2, a schematic diagram of one embodiment of a wind turbine power system 100 ("wind turbine system") is illustrated in accordance with aspects of the present disclosure. Although the present disclosure will generally be described herein with reference to the system 100 shown in FIG. 2, those of ordinary skill in the art, using the disclosures provided herein, should understand that aspects of the present disclosure may also be applicable in other power generation systems, and, as mentioned above, that the invention is not limited to wind turbine systems.

Figure 3:
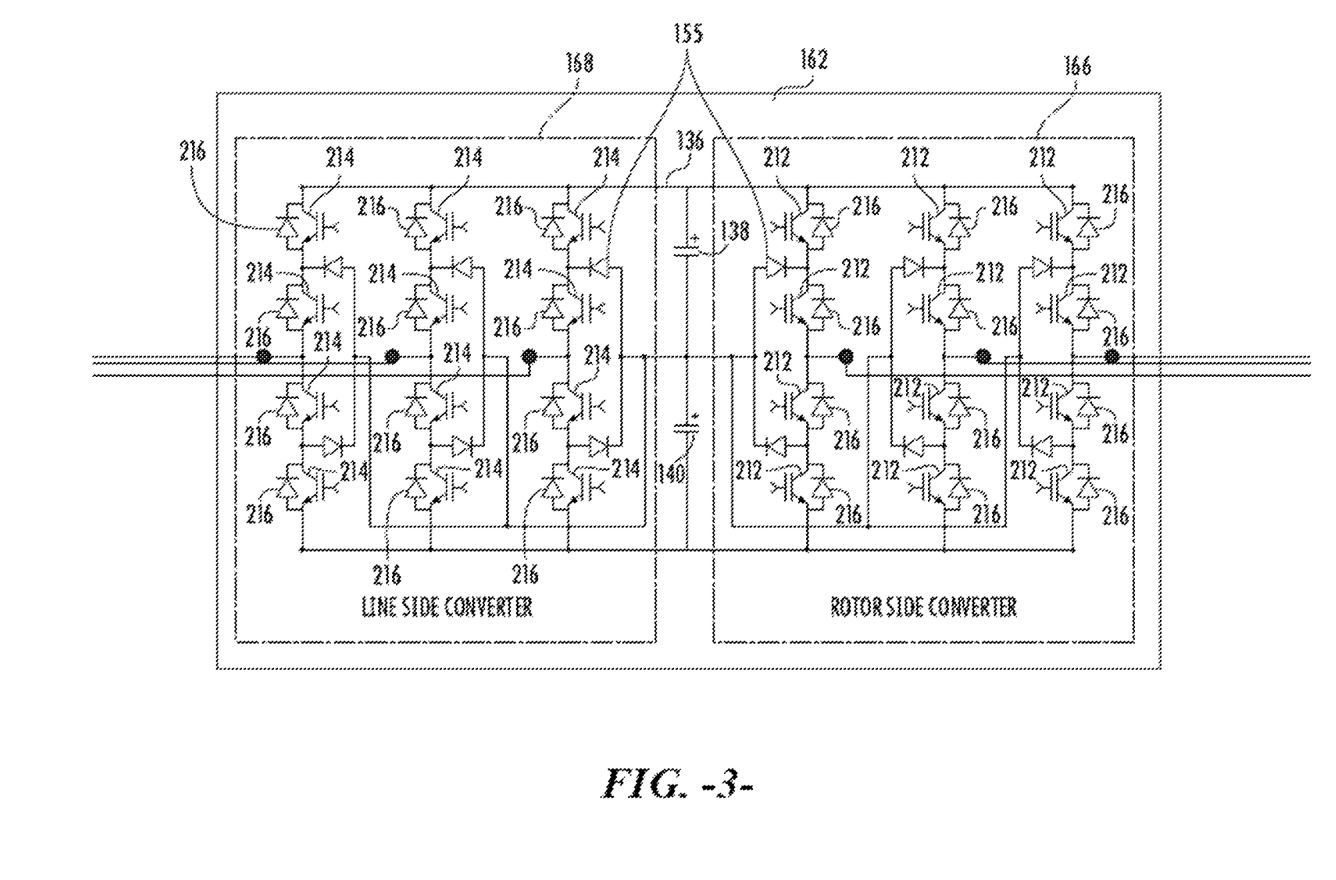
FIG. 3 illustrates a schematic diagram of one embodiment of a conventional three-level voltage-source power converter of a wind turbine according to the present disclosure.

In the embodiment of FIG. 2, the rotor 18 of the wind turbine 10 (FIG. 1) may, optionally, be coupled to a gearbox 118, which is, in turn, coupled to a generator 120, which may be a doubly fed induction generator (DFIG). As shown, the DFIG 120 may be connected to a stator bus 154. Further, as shown, a power converter 162 may be connected to the DFIG 120 via a rotor bus 156, and to the stator bus 154 via a line side bus 188. As such, the stator bus 154 may provide an output multiphase power (e.g., three-phase power) from a stator of the DFIG 120, and the rotor bus 156 may provide an output multiphase power (e.g., three-phase power) from a rotor of the DFIG 120. The power converter 162 may also include a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is at least one DC link capacitor 138, 140. As shown in FIG. 3, the DC link 136 includes an upper capacitor 138 and a lower capacitor 140. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 may be coupled to a converter controller 174 in order to control the operation of the rotor side converter 166 and/or the line side converter 168 as described herein. It should be noted that the converter controller 174 may be configured as an interface between the power converter 162 and a local wind turbine control system 176 and may include any number of control devices. In one embodiment, the controller 174 may include a processing device (e.g., microprocessor, microcontroller, etc.) executing computer-readable instructions stored in a computer-readable medium. The instructions when executed by the processing device may cause the processing device to perform operations, including providing control commands (e.g., switching frequency commands) to the switching elements of the power converter 162. For an individual DFIG wind turbine power system 100, the reactive power may be supplied primarily by the RSC 166, via the generator 120 and the LSC 168.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g., three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g., IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g., IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g., three-phase power) having a frequency maintained substantially at the frequency of the electrical grid 184 (e.g., 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from, for instance, the local control system 176 via the converter controller 174. The control signals may be based, among other things, on sensed states or operating characteristics of the wind turbine power system 100. Typically, the control signals provide for control of the operation of the power converter 162. For example, feedback in the form of a sensed speed of the DFIG 120 may be used to control the conversion of the output power from the rotor bus 156 to maintain a proper and balanced multi-phase (e.g., three-phase) power supply. Other feedback from other sensors may also be used by the controller 174 or control system 176 to control the power converter 162, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 162 also compensates or adjusts the frequency of the three-phase power from the rotor for changes, for example, in the wind speed at the hub 20 and the blades 22. Therefore, mechanical and electrical rotor frequencies are decoupled, and the electrical stator and rotor frequency matching is facilitated substantially independently of the mechanical rotor speed.

Under some states, the bi-directional characteristics of the power converter 162, and specifically, the bi-directional characteristics of the LSC 168 and RSC 166, facilitate feeding back at least some of the generated electrical power into generator rotor. More specifically, electrical power may be transmitted from the stator bus 154 to the line side bus 188 and subsequently through the line contactor 172 and into the power converter 162, specifically the LSC 168 which acts as a rectifier and rectifies the sinusoidal, three-phase AC power to DC power. The DC power is transmitted into the DC link 136. The capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power by adjusting voltages, currents, and frequencies. This conversion is monitored and controlled via the converter controller 174. The converted AC power is transmitted from the RSC 166 via the rotor bus 156 to the generator rotor. In this manner, generator reactive power control is facilitated by controlling rotor current and voltage.

Referring now to FIG. 3, a detailed, schematic diagram of one embodiment of the three-level neutral point clamped (NPC) voltage source power converter (i.e., a converter where output voltage has three possible values) shown in FIG. 2 is illustrated for sake of discussion and an understanding of the operating principles of the present disclosure.

As shown, the RSC 166 includes a plurality of bridge circuits and at least one clamping diode 155 with each phase of the rotor bus 156 input to the rotor side converter 166 being coupled to a single bridge circuit. In addition, the LSC 168 may also include a plurality of bridge circuits and at least one clamping diode 155. Similar to the rotor side converter 166, the line side converter 168 also includes a single bridge circuit for each output phase of the line side converter 168. In other embodiments, the line side converter 168, the rotor side converter 166, or both the line side converter 168 and the rotor side converter 166 may include parallel bridge circuits without deviating from the scope of the present disclosure.

Moreover, as shown, each bridge circuit may generally include a plurality of switching elements (e.g., IGBTs) coupled in series with one another. For instance, as shown in FIG. 3, the plurality of switching devices of each bridge circuit may be arranged in a neutral point clamped (NPC) topology. As described herein, an NPC topology generally refers to a topology containing two series-connected high-side switches and two series-connected low-side switches. Often, IGBTs with anti-parallel diodes are used as the switches for an NPC converter, but other two-quadrant switch configurations can also be employed. In particular, as shown in FIG. 3, the RSC 166 may include a plurality of first IGBTs 212 and the LSC 168 may include a plurality of second IGBTs 214. In addition, as shown, a diode 216 may be coupled in parallel with each of the IGBTs 212, 214. As is generally understood, the LSC 168 and the RSC 166 may be controlled, for instance, by providing control commands, using a suitable driver circuit, to the gates of the IGBTs. For example, the converter controller 174 may provide suitable gate timing commands to the gates of the IGBTs of the bridge circuits. The control commands may control gate timing commands of the IGBTs to provide a desired output. It should be appreciated by those of ordinary skill in the art that, as an alternative to IGBTs, the power convertor 162 may include any other suitable switching elements.

Three-level neutral point clamped (NPC) converters must take less voltage stress because of the series connection arrangement compared to two-level converters. However, due to large commutation loops, inner switching devices of the power converter experience higher voltage spikes and demands to have lossy snubbers in place. To avoid snubbers, active neutral point clamped (ANPC) converters with active clamped switches offer shorter commutation loops compared to NPC. Further, double dead time PWM techniques applied to ANPC offer lesser voltage stress on the inner switching devices. In line with ANPC converters, it is important to detect device failure quickly and assign a failure response mode instantly to protect the DC link and avoid chain reaction failure on other devices, and to provide for continued "fault tolerant" operation of the power converter.

Figure 4:
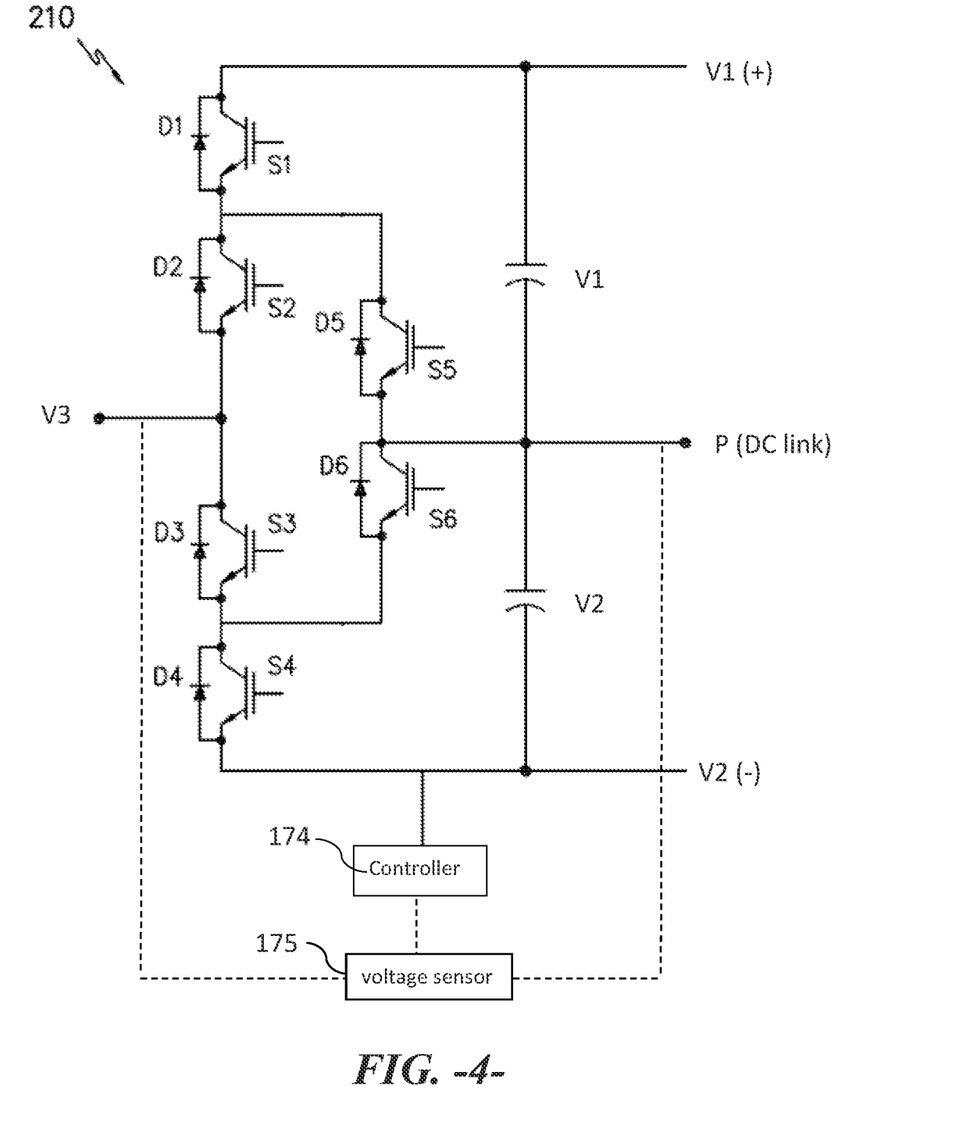
FIG. 4 illustrates a schematic diagram of one embodiment of a single-phase main circuit of a power converter according to the present disclosure.

Referring now to FIG. 4, a schematic diagram of a single-phase main circuit 210 of a switching branch of an ANPC power converter is illustrated in accordance with aspects of the present subject matter. The switching branch may be part of the rotor side converter 166 or the line side converter 168 in FIG. 3. Furthermore, as mentioned, the main circuit 210 has an active neutral point clamped (ANPC) topology, which generally refers to a topology having six diodes (e.g., D1 to D6) and six controllable semiconductor switches (e.g., S1 to S6). A converter comprising one or more switching branches, like that of FIG. 4, may operate as a rectifier or as an inverter. In addition, it should be understood that each phase of the rotor bus 156 or the stator bus 188 may be coupled to a circuit with the same topology as the main circuit 210.

Still referring to FIG. 4, the plurality of the switching devices S1-S6 (e.g., IGBTs) are coupled together with a diode D1-D6 coupled in parallel with each of the IGBT switches. As shown, each leg of the converter includes two outer switching devices S1, S4 and four inner switching devices S2, S3, S5, and S6. The line side converter 168 and the rotor side converter 166 are controlled, for instance, by providing control commands ("gate drive signals"), using a suitable driver circuit, to the gates of the IGBTs S1-S6. For example, in an embodiment, the controller 174 can provide suitable gate timing commands to the gates of the IGBTs to control the pulse width modulation of the IGBTs in order to produce a desired output. In one embodiment, the main circuit 210 may be controlled by the controller 174 according to a substantially non-interleaved switching pattern such that the switching elements of the main circuit 210 are switched in phase with one another. In other embodiments, the main circuit 210 may be controlled according to any other suitable switching pattern. It will be appreciated by those of ordinary skill in the art that other suitable switching elements can be used in place of IGBTs.

Input voltages V1 and V2 are controlled to each have a voltage equal to Vdc/2, where Vdc is the total DC link voltage. Voltage V3P is the phase A output voltage measured with respect to a center point of DC link. The potential difference between VP and V3 is the pole voltage of the controller. Switching device S1 is complementary to switching device S3 so that, when switching device S1 is gated on, switching device S3 is gated off and vice versa. Similarly, switching devices S2 and S4 are complementary.

In operation, each leg of the ANPC three-level converter has three switching stages. In the first switching stage, switching devices S1, S2 are turned on, S5 and S6 are turned off, and S3 and S4 are turned off. Assuming a stable operation, V1=V2=Vdc/2, and V3 becomes Vdc/2. In the second switching stage, switching devices S2, S3 are turned, S1 and S4 are turned off, and S5 and S6 are turned on. In this stage, V3 is equal to zero. In the third switching stage, switching devices S1, S2 are turned off, S5 and S6 are turned off, and S3 and S4 are turned on. This results in V3 becoming −Vdc/2. Thus, it can be seen that the phase voltage V3 has three levels Vdc/2, −Vdc/2 and 0. When all three legs of the ANPC three-phase converter are combined, then the resulting line to line voltages have five levels namely Vdc, Vdc/2, 0, −Vdc/2 and −Vdc. The three-level converter of FIG. 3 may be increased to any level depending on the circuit topology and number of switching devices and diodes in the circuit. As the number of levels in the converter increases, the output waveform of the converter approaches a pure sine wave, resulting in lower harmonics in the output voltage. In general, the number of switching stages can be higher than three as switching devices may not be gated on if the corresponding free-wheeling diode is going to conduct current. This operation mode does not affect the number of levels of the output phase voltage.

In a three level ANPC converter, a key failure mode exists when an inner switching device (e.g., S2, S3, S5, S6) fails short. Under this condition, one half of the DC link, V1 or V2 in FIG. 4, is charged to the peak line-to-line voltage of the machine or grid side voltage. When S1 fails, the inner switching device S2 is susceptible to full DC link voltage. These values are typically higher than the maximum allowed blocking voltage of the switching devices and the capacitors. In this case, other switching devices or clamping diodes may be stressed in terms of voltage or current beyond their capability. Hence, this will cause additional switching devices, in particular switching devices in phase legs connected to the same DC bus, to fail after the failure of the initial switching device.

Suitable logic circuits are known in the art to detect failures in the switching device and prevent secondary damage to the multi-level power converter. An example of a suitable failure-detection method is described, for example, in U.S. patent application Ser. No. 17/534,507 filed on Nov. 24, 2021.

It should be appreciated that the present methods and systems are not dependent upon actual detection of a failed switching device. As explained below, the on/off scheme for the switching devices may be implemented regardless of whether or not a switching device has actually failed in the converter. However, it is also within the scope of the present methods and systems that the on/off scheme is for the converter is not implemented until a switching device has actually failed.

Figure 6:
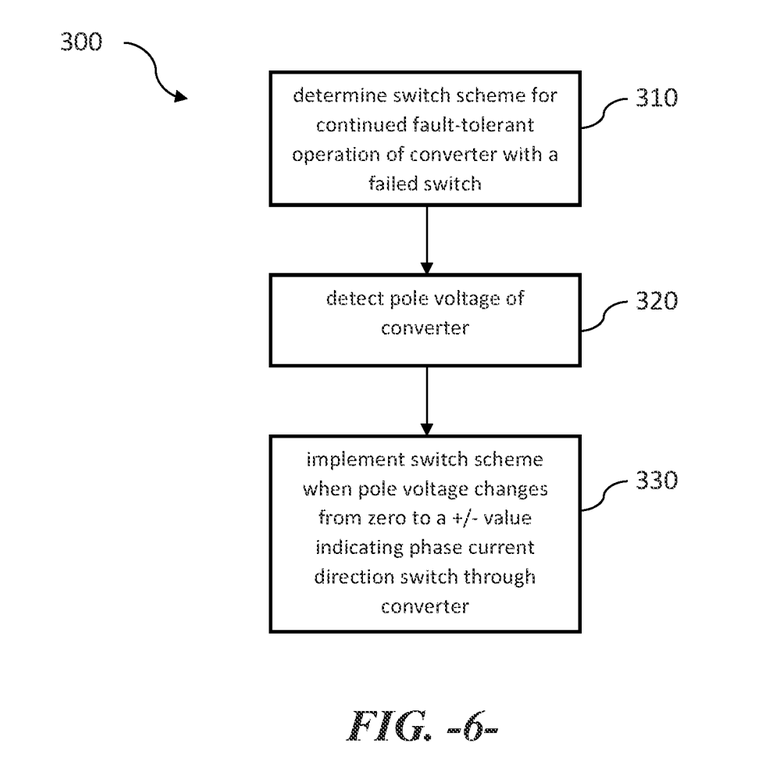
FIG. 6 illustrates a flow diagram of an embodiment of a method for operating a multi-level bridge power converter of an electrical power system connected to a power grid according to the present disclosure.

FIG. 6 presents a block diagram of aspects of the current methodology 300 for providing continuous fault-tolerant operation of the converter of FIG. 4 when one of the outer switches S1 or S4 has failed in a shorted condition.

At step 310, the method includes determining an on/off scheme for the switching devices in the first converter that provides for continuous fault-tolerant operation of the first converter. This scheme may be predetermined and stored in the controller for subsequent retrieval by the controller as the operational scheme for the controller regardless of whether or not a switch has failed. Alternatively, the scheme may be determined or selected at the time of detecting that the specific switch has failed. The on/off scheme is implemented (via gate drive signals from the controller) upon change of the phase current direction through the first converter in the zero voltage (pole voltage) state of the first converter. However, basing this transition on directly sensing the phase current via a current sensor may not be reliable since the current is already near its zero crossing and it is difficult to detect the exact instance in time where the current crosses into the other polarity.

Accordingly, at step 3200, the method detects the pole voltage of the first converter via, for example, a voltage sensor (sensor 175 in FIG. 4) that is configured to directly sense the pole voltage across the converter. Alternatively, pole voltage information can also come from the DESAT circuitry of the switching devices. The pole voltage switches essentially instantaneously from zero to +−vdc/2 when current polarity changes in a constant zero voltage state. Since the pole voltage change is relatively large in magnitude, it is easier and more reliable to detect with a voltage sensor and is an accurate indirect indication of the current polarity reversal.

At step 330, based on the sensed voltage change, the method implements the switch scheme that protects the converter from a cascading failure and enables continued fault-tolerant operation of the converter.

Figure 5A:
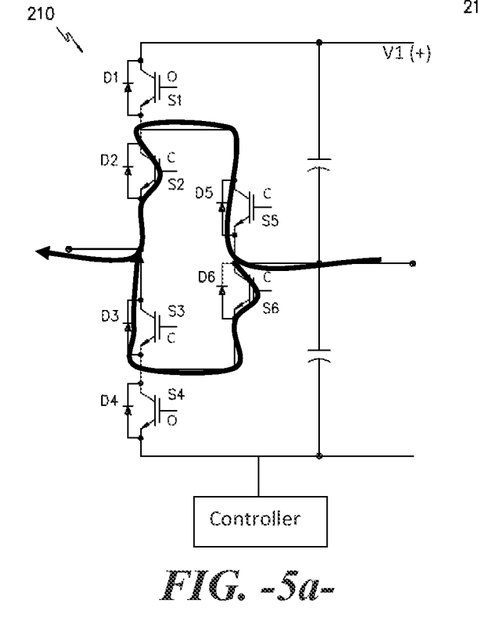
FIG. 5a illustrates a schematic diagram of the phase current path for the power converter branch of FIG. 4.
Figure 5B:
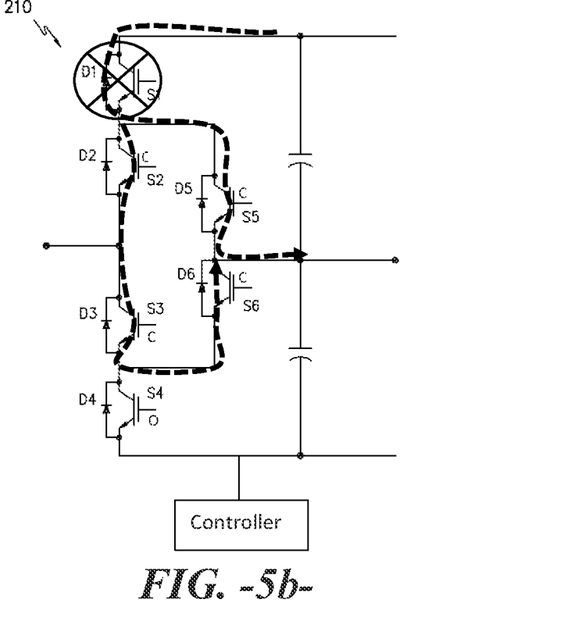
FIG. 5b illustrates a schematic diagram of the phase current path, including shoot through, for the power converter branch of FIG. 3 with an outer switch in a failed (shorted) state.
Figure 5C:
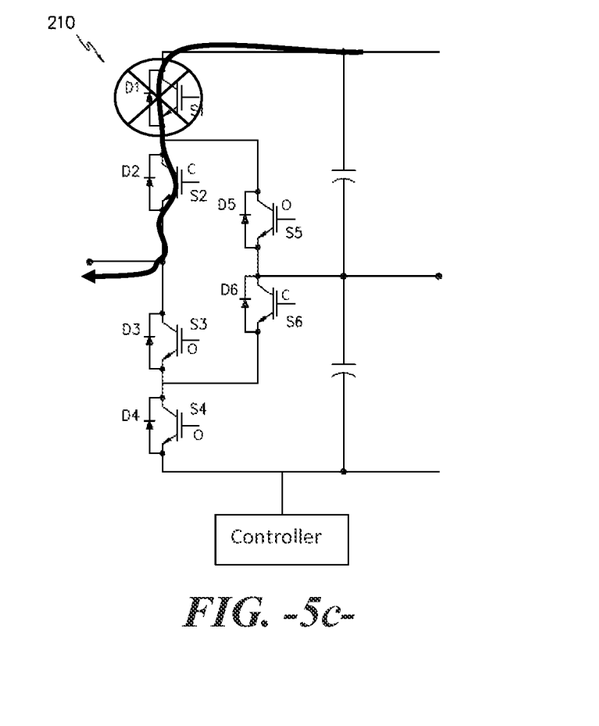
FIG. 5c illustrates a schematic diagram of the phase current path for the power converter branch of FIG. 5b in a fault-tolerant scheme of the switching devices.

FIGS. 5a through 5c depict aspects of the present method and apparatus related to a single bridge circuit 210 (similar to the bridge circuit of FIG. 4) of a multi-level ANCP converter. It should be appreciated that the discussion pertains to each circuit or level in a multi-level converter, such as the three-level rotor-side and line-side converters of the power converter depicted in FIG. 3.

In FIG. 5A, the circuit includes six switches S1-S6 with associated parallel diodes D1-D6. All of the switches are functional. Phase current has switched direction through the circuit and is indicated by the heavy directional line in the zero-voltage state of the circuit, wherein all four inner switches S2, S3, S5, S6 are all "on" or closed and the outer switches S1, S4 are "off" or open.

In FIG. 5B, the outer switch S1 has failed in a shorted state. Upon closure of the inner switches S2, S3, S5, S6 for phase current reversal in the zero-voltage state of the circuit, an instantaneous direct current path is established from the positive voltage side of the circuit through the DC link that couples the converter to a second converter, for example in the type of power converter depicted in FIG. 3. This is referred to as a "shoot-through" event. Such events can lead to a cascading failure of the converter components.

Referring to FIG. 5c, the shoot-through event can be avoided by selecting only the switching devices in the circuit that are required for the direction of phase current at that particular time. This strategy or "on/off scheme" for the switches is termed in the art as skip-fire PWM, which selects the necessary switching vector based on the direction phase current. When the current switches phase direction, the switching vector needs to be changed accordingly to implement the skip-fire PWM scheme wherein switches S5, S3 are "off" or open and switches S2, S6 are "on" or closed.

Although not depicted in FIGS. 5a-5c, the failed switch may be the opposite outer switch S4. In this case, the skip-fire PWM scheme would have switches S5, S3 "on" or closed and switches S2, S6 "off" or opened.

Further aspects of the disclosure are provided by the subject matter of the following clauses:

Clause 1: A controller-implemented method for operating a multi-level bridge power converter of an electrical power system in a fault-tolerant operational mode, the electrical power system connected to a power grid and the multi-level power converter comprising a first converter coupled to a DC link, the first converter comprising a plurality of switching devices, the method comprising: determining an on/off scheme for the switching devices in the first converter that provides for continuous fault-tolerant operation of the first converter, wherein the on/off scheme is dependent upon phase current direction through the first converter; and indirectly determining the phase current direction by sensing a pole voltage of the first converter and implementing the on/off scheme in the fault-tolerant mode when the pole voltage changes from zero to a +/−value indicating that the phase current through the first converter has switched direction.

Clause 2: The method according to clause 1, wherein the plurality of switching devices in the first converter includes at least four inner switching devices and at least two outer switching devices in an active neutral point clamped topology, wherein the first converter connects to the DC-link by turning on the inner switching devices, and wherein in the fault-tolerant operational mode one of the outer switching devices is failed in the shorted state and the on/off scheme prevents a current shoot-through across the DC-link when connecting the first converter to the DC-link.

Clause 3: The method according to any one of clauses 2-3, wherein the switching devices are insulated gate bipolar transistors (IGBTs) and designated as a first IGBT through a sixth IGBT, wherein the second IGBT, the third IGBT, the fifth IGBT, and the sixth IGBT are the inner switching devices, and the first IGBT and the fourth IGBT are the two outer switching devices, wherein in the on/off scheme:

the first IGBT is failed in the shorted state, the second IGBT and the sixth IGBT are on; and the fifth IGBT and the third IGBT are off; or the fourth IGBT is failed in the shorted state, the third IGBT and the fifth IGBT are on; and the second and the sixth IGBT are off.

Clause 4: The method according to any one of clauses 1-3, wherein the pole voltage is directly sensed by a voltage sensor.

Clause 5: The method according to any one of clauses 1-4, wherein the first converter is coupled to a second converter via the DC-link, the second converter comprising a plurality of the switching devices, wherein the method functions to provide operation in the fault tolerant mode of the second converter when one of the switching devices in the second converter has failed in a shorted state.

Clause 6: The method according to any one of clauses 1-5, wherein the electrical power system is a wind turbine power system and includes a generator connected to the power grid.

Clause 7: A controller-implemented method for operating a multi-level bridge power converter of an electrical power system in a fault-tolerant operational mode, the electrical power system connected to a power grid and the multi-level power converter comprising a first converter and a second converter coupled together via a DC link, each of the first and second converters comprising a plurality of switching devices, wherein one of the switching devices in the first or second converter is failed in a shorted state, the method comprising:

determining an on/off scheme for the switching devices in the first and second converters that provides for continuous fault-tolerant operation of the respective converter when one or more of the switching devices in the respective converter has failed in a shorted state, wherein the on/off scheme is dependent upon phase current direction through the respective converter; and indirectly determining the phase current direction through the respective converter by sensing a pole voltage of the respective converter and implementing the on/off scheme when the pole voltage changes from zero to a +/−value indicating that the phase current through the respective converter has switched direction.

Clause 8: The method according to clause 7, wherein the plurality of switching devices in each of the first and second converters includes at least four inner switching devices and at least two outer switching devices in an active neutral point clamped topology, wherein the first and second converters connect to the DC-link by turning on the inner switching devices, and wherein in the fault-tolerant operational mode one of the outer switching devices is failed in the shorted state and the on/off scheme prevents a current shoot-through across the DC-link when connecting the first or second converter to the DC-link.

Clause 9: The method according to any one of clauses 7-8, wherein the switching devices are insulated gate bipolar transistors (IGBTs) and designated as a first IGBT through a sixth IGBT, wherein the second IGBT, the third IGBT, the fifth IGBT, and the sixth IGBT are the inner switching devices, and the first IGBT and the fourth IGBT are the two outer switching devices, wherein in the on/off scheme:

the first IGBT is failed in the shorted state, the second IGBT and the sixth IGBT are on; and the fifth IGBT and the third IGBT are off; or the fourth IGBT is failed in the shorted state, the third IGBT and the fifth IGBT are on; and the second and the sixth IGBT are off.

Clause 10: The method according to any one of clauses 7-9, wherein the pole voltage is sensed directly by a voltage sensor.

Clause 11: A multi-level bridge power converter with a plurality of phase legs, comprising:
 a first converter and a second converter coupled together via a DC link, each of the first and second converters comprising a plurality of switching devices;
 a controller configured to operate the first and second converters in a fault-tolerant mode when one of the switching devices in the first or second converter is failed in a shorted state, the controller configured to:
 implement an on/off scheme for the switching devices in the first and second converters that provides for continuous fault-tolerant operation of the respective converter when one or more of the switching devices in the respective converter has failed in a shorted state, wherein the on/off scheme is dependent upon phase current direction through the respective converter;
 indirectly determine the phase current direction through the respective converter by sensing a pole voltage of the respective converter; and
 implement the on/off scheme when the pole voltage changes from zero to a +/−value indicating that the phase current through the respective converter has switched direction.

Clause 12: The multi-level bridge power converter according to clause 11, wherein the plurality of switching devices in each of the first and second converters comprises at least four inner switching devices and at least two outer switching devices in an active neutral point clamped topology, wherein the first and second converters connect to the DC-link by the controller turning on the inner switching devices, and wherein in the fault-tolerant operational mode one of the outer switching devices is failed in the shorted state and the on/off scheme implemented by the controller prevents a current shoot-through across the DC-link when connecting the first or second converter to the DC-link.

Clause 13: The multi-level bridge power converter according to any one of clauses 11-12, wherein the switching devices are insulated gate bipolar transistors (IGBTs) and designated as a first IGBT through a sixth IGBT, wherein the second IGBT, the third IGBT, the fifth IGBT, and the sixth IGBT are the inner switching devices, and the first IGBT and the fourth IGBT are the two outer switching devices, wherein in the on/off scheme of the fault-toleration operation:
 the first IGBT is failed in the shorted state, the second IGBT and the sixth IGBT are on; and the fifth IGBT and the third IGBT are off; or
 the fourth IGBT is failed in the shorted state, the third IGBT and the fifth IGBT are on; and the second and the sixth IGBT are off.

Clause 14: The multi-level bridge power converter according to clauses 11-13, further comprising a voltage sensor configured to detect the pole voltage of the respective converter, the voltage sensor in communication with the controller.

Clause 15: An electrical power system configured to supply electrical power to a power grid, the electrical power system comprising the multi-level power converter according to clauses 11-14.

Clause 16: The electrical power system according to clause 15, wherein the electrical power system comprises a wind turbine generator configured with the multi-level power converter.

This written description uses examples to disclose the disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A controller-implemented method for operating a multi-level bridge power converter of an electrical power system in a fault-tolerant mode, the electrical power system connected to a power grid and the multi-level bridge power converter comprising a first converter coupled to a DC link, the first converter comprising a plurality of switching devices, the method comprising:
 determining an on/off scheme for the plurality of switching devices in the first converter that provides for continuous fault-tolerant operation of the first converter when one or more of the plurality of switching devices has failed in a shorted state, wherein the on/off scheme is dependent upon phase current direction through the first converter; and
 indirectly determining the phase current direction by sensing a pole voltage of the first converter and implementing the on/off scheme in the fault-tolerant mode when the pole voltage changes from zero to a +/−value indicating that the phase current through the first converter has switched direction;
 wherein the plurality of switching devices in the first converter includes at least four inner switching devices and at least two outer switching devices in an active neutral point clamped topology, wherein the first converter connects to the DC-link by turning on the at least four inner switching devices, and wherein in the fault-tolerant mode one of the at least two outer switching devices is failed in the shorted state and the on/off scheme prevents a current shoot-through across the DC-link when connecting the first converter to the DC-link;
 wherein the plurality of switching devices are designated as a first through a sixth switching device, wherein the second, the third, the fifth, and the sixth switching devices are the at least four inner switching devices, and the first and the fourth switching devices are the at least two outer switching devices, wherein in the on/off scheme:
  when the first switching device is failed in the shorted state, the second switching device and the sixth switching device are on and the fifth switching device and the third switching device are off; or
  when the fourth switching device is failed in the shorted state, the third switching device and the fifth switching device are on and the second switching device and the sixth switching device are off;
 wherein the pole voltage is directly sensed by a voltage sensor; and
 wherein the first converter is coupled to a second converter via the DC-link, the second converter comprising a second plurality of the switching devices, wherein the method functions to provide operation in the fault-tolerant mode of the second converter when one of the second plurality of the switching devices in the second converter has failed in the shorted state.

2. The controller-implemented method according to claim 1, wherein the plurality of switching devices are insulated gate bipolar transistors (IGBTs).

3. The controller-implemented method according to claim 1, wherein the electrical power system is a wind turbine power system and includes a generator connected to the power grid.

4. A controller-implemented method for operating a multi-level bridge power converter of an electrical power system in a fault-tolerant mode, the electrical power system connected to a power grid and the multi-level bridge power converter comprising a first converter and a second converter coupled together via a DC link, each of the first and second converters comprising a plurality of switching devices, wherein one of the plurality of switching devices in the first converter or in the second converter is failed in a shorted state, the method comprising:
  determining an on/off scheme for the plurality of switching devices in the first and second converters that provides for continuous fault-tolerant operation of the respective converter when one or more of the plurality of switching devices in the respective converter has failed in the shorted state, wherein the on/off scheme is dependent upon phase current direction through the respective converter; and
  indirectly determining the phase current direction through the respective converter by sensing a pole voltage of the respective converter and implementing the on/off scheme when the pole voltage changes from zero to a +/−value indicating that the phase current through the respective converter has switched direction;
  wherein the plurality of switching devices in each of the first and second converters includes at least four inner switching devices and at least two outer switching devices in an active neutral point clamped topology, wherein the first and second converters connect to the DC-link by turning on the at least four inner switching devices, and wherein in the fault-tolerant mode one of the at least two outer switching devices is failed in the shorted state and the on/off scheme prevents a current shoot-through across the DC-link when connecting the first converter or the second converter to the DC-link;
  wherein the plurality of switching devices are designated as a first switching device through a sixth switching device, wherein the second, the third, the fifth, and the sixth switching devices are the at least four inner switching devices, and the first and the fourth switching devices are the at least two outer switching devices, wherein in the on/off scheme:
    when the first switching device is failed in the shorted state, the second switching device and the sixth switching device are on and the fifth switching device and the third switching device are off; or
    when the fourth switching device is failed in the shorted state, the third switching device and the fifth switching device are on and the second switching device and the sixth switching device are off; and
  wherein the pole voltage is sensed directly by a voltage sensor.

5. The controller-implemented method according to claim 4, wherein the plurality of switching devices are insulated gate bipolar transistors (IGBTs).

6. A multi-level bridge power converter with a plurality of phase legs, comprising:
  a first converter and a second converter coupled together via a DC link, each of the first and second converters comprising a plurality of switching devices;
  a controller configured to operate the first and second converters in a fault-tolerant operational mode when one of the plurality of switching devices in the first converter or in the second converter is failed in a shorted state, the controller configured to:
    implement an on/off scheme for the plurality of switching devices in the first and second converters that provides for continuous fault-tolerant operation of the respective converter when one or more of the plurality of switching devices in the respective converter has failed in the shorted state, wherein the on/off scheme is dependent upon phase current direction through the respective converter;
    indirectly determine the phase current direction through the respective converter by sensing a pole voltage of the respective converter; and
    implement the on/off scheme when the pole voltage changes from zero to a +/−value indicating that the phase current through the respective converter has switched direction;
  wherein the plurality of switching devices in each of the first and second converters comprises at least four inner switching devices and at least two outer switching devices in an active neutral point clamped topology, wherein the first and second converters connect to the DC-link by the controller turning on the at least four inner switching devices, and wherein in the fault-tolerant operational mode one of the at least two outer switching devices is failed in the shorted state and the on/off scheme implemented by the controller prevents a current shoot-through across the DC-link when connecting the first converter or the second converter to the DC-link;
  wherein the plurality of switching devices are designated as a first switching device through a sixth switching device, wherein the second, the third, the fifth, and the sixth switching devices are the at least four inner switching devices, and the first switching device and the fourth switching device are the at least two outer switching devices, wherein in the on/off scheme of the fault-toleration operation:
    when the first switching device is failed in the shorted state, the second switching device and the sixth switching device are on and the fifth switching device and the third switching device are off; or
    when the fourth switching device is failed in the shorted state, the third switching device and the fifth switching device are on and the second switching device and the sixth switching device are off; and
  a voltage sensor configured to detect the pole voltage of the respective converter, the voltage sensor is in communication with the controller.

7. The multi-level bridge power converter according to claim 6, wherein the plurality of switching devices are insulated gate bipolar transistors (IGBTs).

8. An electrical power system configured to supply electrical power to a power grid, the electrical power system comprising the multi-level bridge power converter according to claim 6.

9. The electrical power system according to claim 8, wherein the electrical power system comprises a wind turbine generator configured with the multi-level bridge power converter.

* * * * *